(No Model.)  J. W. UPSON.  4 Sheets—Sheet 1.
STEAM GENERATOR.

No. 294,291. Patented Feb. 26, 1884.

Fig. I.

WITNESSES  INVENTOR
H. Engel  James W. Upson
Geo. W. King  By Leggett & Leggett
ATTORNEYS (No Model.) 4 Sheets—Sheet 3.
J. W. UPSON.
STEAM GENERATOR.

No. 294,291. Patented Feb. 26, 1884.

WITNESSES
H. Engel
Geo. W. King

James W. Upson
INVENTOR
By Leggett & Leggett
ATTORNEYS (No Model.)  4 Sheets—Sheet 4.

J. W. UPSON.
STEAM GENERATOR.

No. 294,291.  Patented Feb. 26, 1884.

WITNESSES
W. Engel
Geo. W. King

James W. Upson   INVENTOR
By Leggett & Leggett
ATTORNEYS

UNITED STATES PATENT OFFICE.

JAMES W. UPSON, OF CLEVELAND, ASSIGNOR TO JAMES E. UPSON, OF SHAWNEE, OHIO.

STEAM-GENERATOR.

SPECIFICATION forming part of Letters Patent No. 294,291, dated February 26, 1884.

Application filed May 22, 1883. (No model.)

*To all whom it may concern:*

Be it known that I, JAMES W. UPSON, of Cleveland, in the county of Cuyahoga and State of Ohio, have invented certain new and useful Improvements in Steam-Generators or Water-Heaters; and I do hereby declare the following to be a full, clear, and exact description of the invention, such as will enable others skilled in the art to which it pertains to make and use the same.

My invention relates to improvements in steam-generators and water-heaters; and it consists of certain features of construction and combination of parts hereinafter described, and pointed out in the claims.

Figure 1:
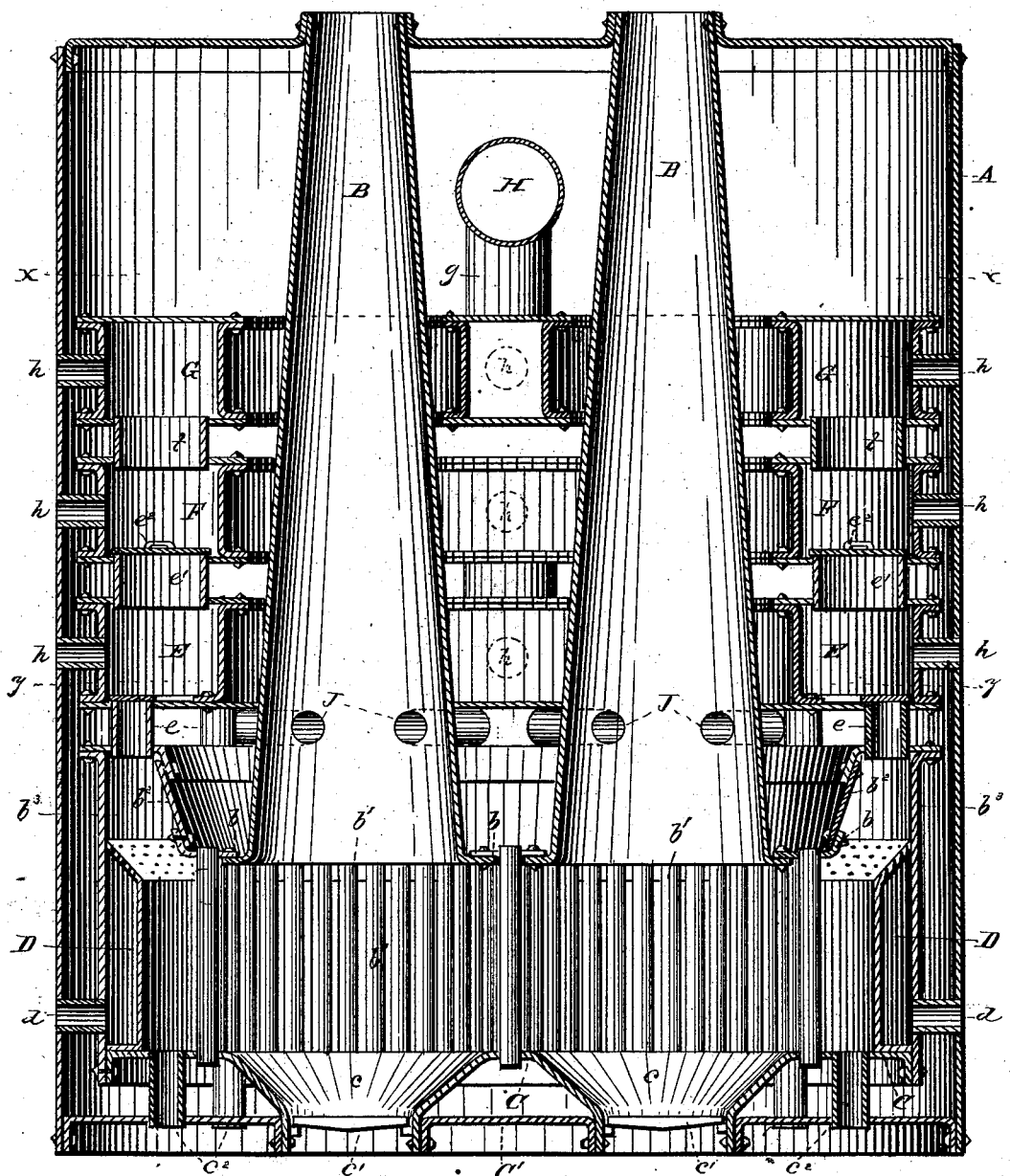
Figure 2:
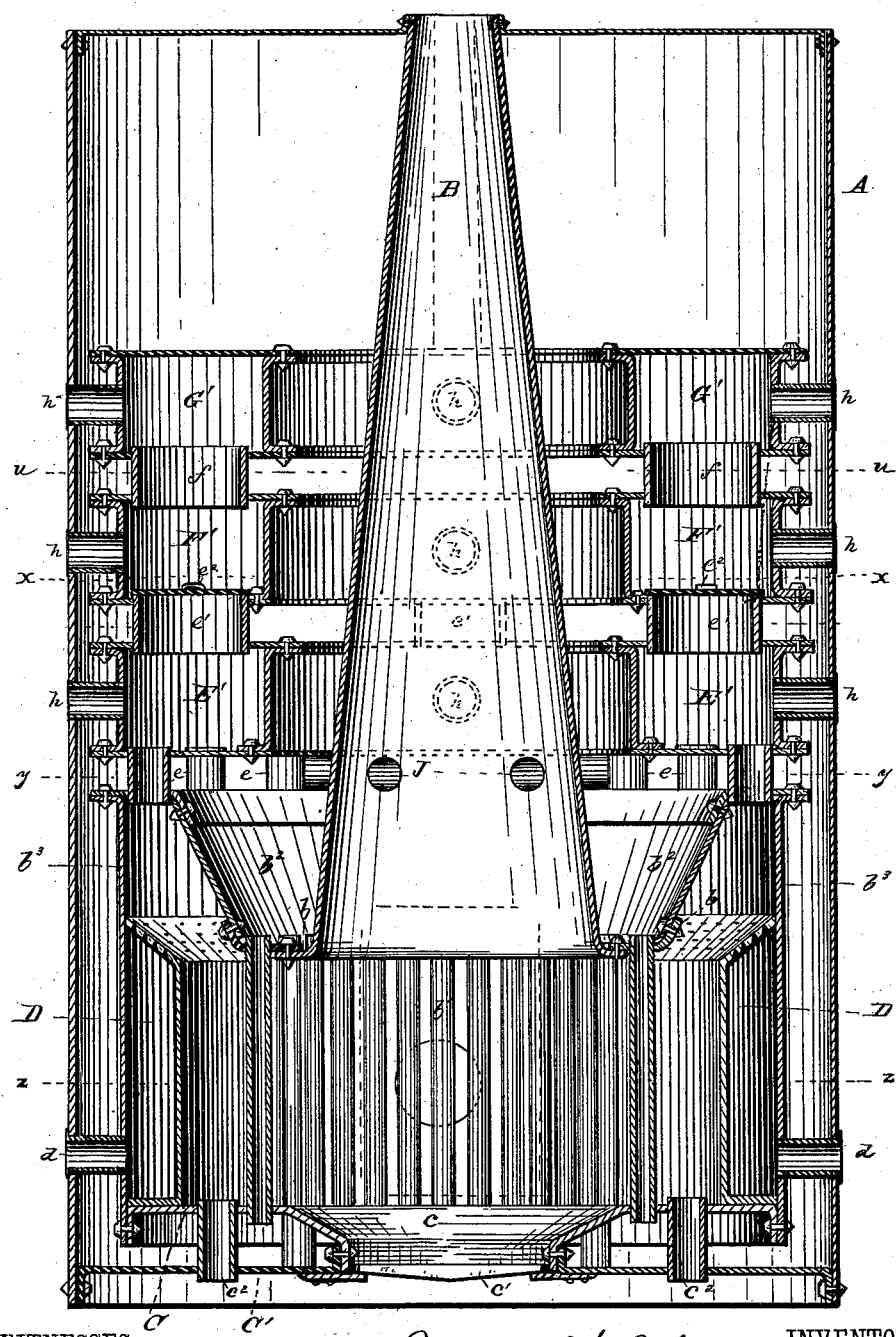
Figure 3:
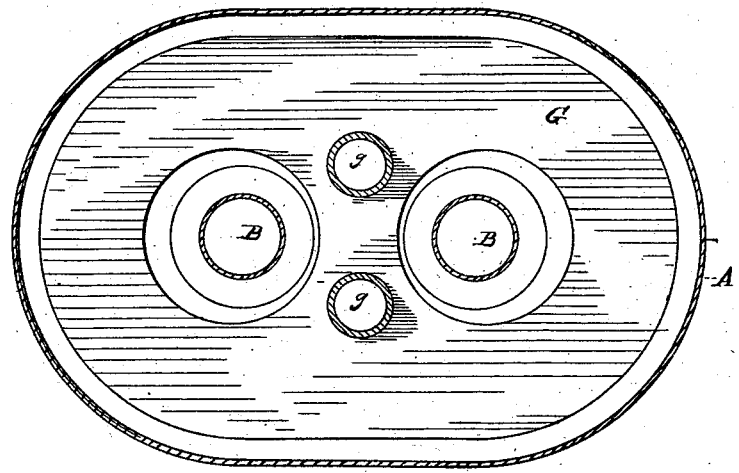
Figure 4:
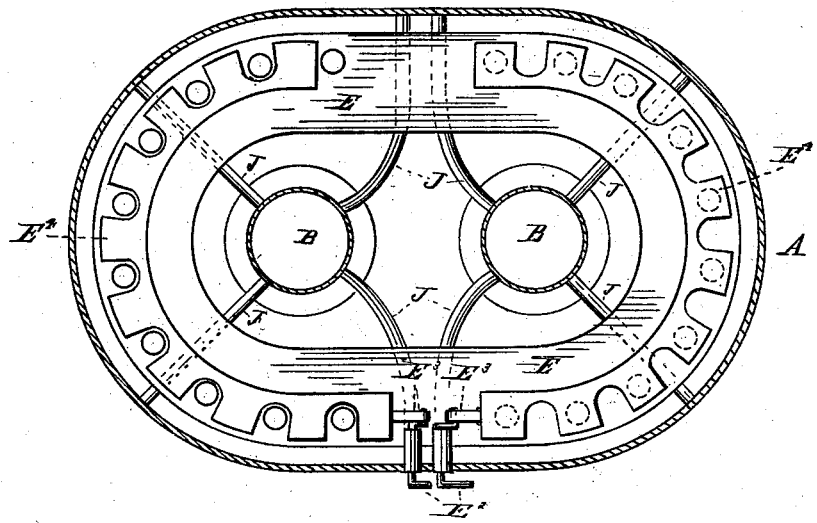
Figure 5:
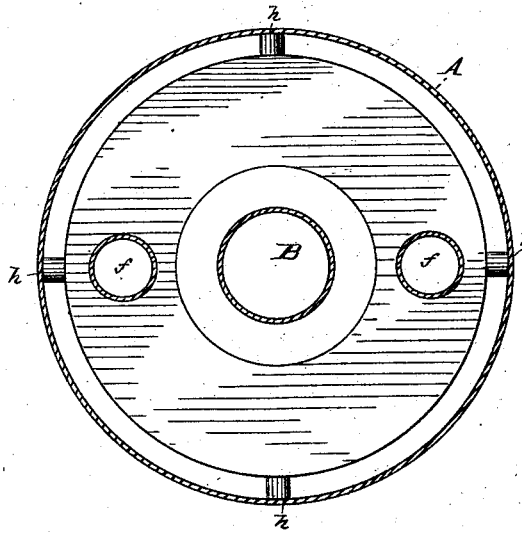
Figure 6:
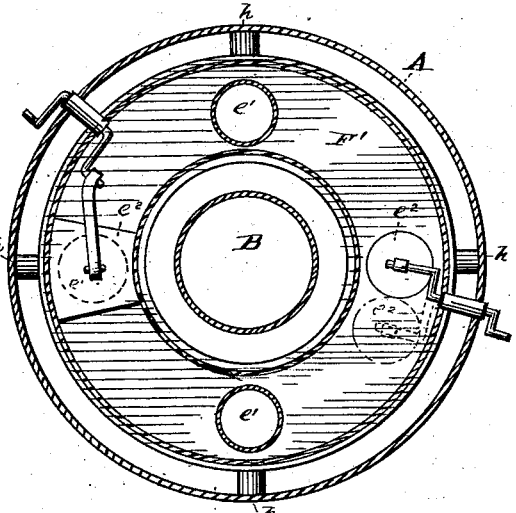
Figure 7:
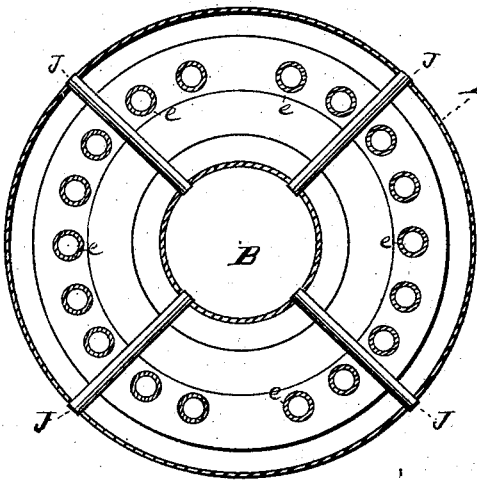
Figure 8:
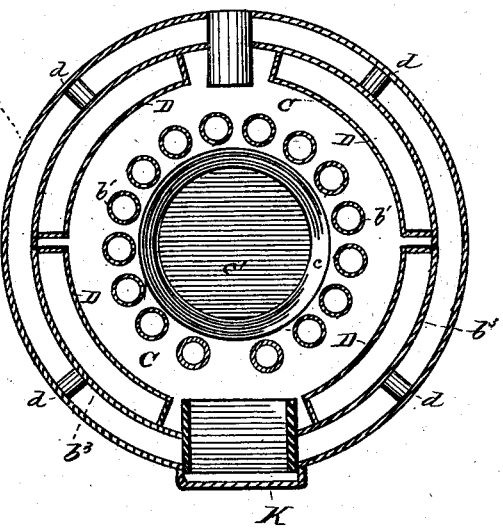

In the drawings, Figure 1 is a vertical sectional view of a boiler with two fuel-magazines, and Fig. 2 is a vertical section view of a boiler with one fuel-magazine, both embodying my invention. Fig. 3 is a cross-section on the line of $x\ x$, Fig. 1. Fig. 4 is a cross-section on the line of $y\ y$, Fig. 1. Fig. 5 is a cross-section on the line of $u\ u$, Fig. 2. Fig. 6 is a cross-section on the line of $x\ x$, Fig. 2. Fig. 7 is a cross-section on the line of $y\ y$, Fig. 2. Fig. 8 is a cross-section on the line of $z\ z$, Fig. 2.

A represents the shell of the boiler, elongated in one direction, to make room for the two fuel-magazines B. These reservoirs are in shape of a truncated cone, and are joined to the head of the boiler above and to the crown-sheet below, as shown. The crown-sheet $b$ is horizontal for a short distance from the reservoirs, to accommodate the tubes $b'$, after which it slopes upward and outward, as shown at $b^2$, and thence outward horizontally, to accommodate the tubes $e$, and joins the vertical sheet $b^3$, that forms the inner part of the water-leg. This plate $b^3$ extends downward and joins the plate C, that forms the bottom of the fire-box.

C' is the bottom head of the boiler, and is connected to the sheet C by the sloping parts $c$, that are a portion of the head C, and are in the shape of an inverted cone, at the bottom of which rest the grate-bars $c'$. The tubes $c^2$ also connect the plates C and C', and are a means of discharging the ashes from behind the tubes $b'$. These tubes $b'$ are set near together in a row around the fire, and connect the water-spaces below and above the fire-box.

D represents plates resting upon the sheet C, and terminating in a sloping perforated top that fits against the plate $b^3$, forming an air-chamber that is supplied with air through the tubes $d$. The air coming in contact with the plate D is heated thereby, and, passing up through the perforations in the top of the plate, is mingled with the gases from the furnace, thereby supplying oxygen for combustion, so that the smoke is usually all consumed. These plates might be made with a back, so as to form the air-chamber complete without the plate $b^3$, if so desired.

E is a hot-air chamber, the shape of which is shown in Fig. 4, and is connected to the fire-box by the tubes $e$.

$E^4$ and $E^4$ are dampers that operate in the chamber E over the ends of the tubes $e$. The damper at the right shows the tubes closed, and the one at the left shows the tubes open, the said dampers being closed, as seen in Fig. 1. When the fire over one of the grates is cleaned and fresh fuel is added, it is better to close the damper above it, so as to pass the gases across the fire on the other side, in order that the smoke may all be consumed. These dampers are operated, preferably, by small cranks attached to rods extending to the outside of the boiler, and provided with handles, as shown at $E^2$. The inner cranks are connected to their respective dampers by the short pitmen $E^3$. The chamber E is connected by the four tubes $e'$ to F—a similar chamber above. Two of the tubes $e'$, that are on opposite sides of the chamber, are provided with dampers $e^2$, they may be similar to either of those shown in Fig. 6. The chamber F is connected to G—a chamber still above—by the two tubes $f$, that are placed directly over the tubes $e$, that are provided with the dampers $e^2$. When these dampers $e^2$ are open, the hot air may pass direct from the chamber E to the chamber G; but when the dampers are closed, the draft can only pass from the chamber E to chamber G by passing around the chamber F in either direction. The tubes $g$ lead from the chamber G to the horizontal smoke-pipe H, that leads from the boiler. The air-tubes J, that lead from the outsides of the boiler to the magazines, supply air above the fire. The fuel will usually be slowly burning or coking up to about this point, and discharging gas or smoke freely, and the air admitted through these tubes and mingling with the gas adds so much oxygen to support the combustion that the smoke is mostly consumed as it passes through the body of hot coals below. The passage of air through these tubes $d$ and $J$ may be controlled by covers or dampers, more or less closing the tubes.

The air-chambers E', F', and G' correspond to the similar chambers, E, F, and G, of Fig. 1, and differ, principally, in the elongation of the latter.

In Fig. 2 is shown a boiler with one fuel-magazine, but otherwise so like the one just described that it will require but little additional description.

In Fig. 5 is shown a plan view of the top of the hot-air chamber F'. The tubes for the smoke-pipe may pass out of the boiler in any desired direction, vertical or horizontal.

In Fig. 6 is shown the bottom of chamber F'. The left-hand damper is connected to the crank by means of a pitman, as shown, while the right-hand damper is connected by a loop to the wrist of the crank, and is lifted by the crank to or from its position over the tube. In any and all of these dampers the rods connecting the inner crank and the outer crank or handle run through a small tube that is screwed into the shell of the boiler and the wall of the hot-air chamber in the usual manner.

In Fig. 7 are shown hot and cold air tubes $e$ and $J$, like those shown in Fig. 1.

In Fig. 8 are shown water-tubes $b'$, like the tubes $b'$ in Fig. 1; also, plates like D of Fig. 1, and forming air-chambers behind them, that are supplied with horizontal tubes, like the tubes $d$, are shown.

K is a door, that may be of any of the ordinary varieties, and $k$ is a tube, that may be used as a door to clean behind the tubes $b'$.

The operation of my device is as follows when used for steam: The water-space is filled with water to a short distance above the top of the upper hot-air chamber. (See G, Fig. 1.) A fire is kindled on the grates, and coal is supplied through the magazines B. It is designed to keep a quantity of coal in the magazine all of the time, so that the lower portion of the coal may become heated, and, if soft coal, coked, before it reaches the fire-box. In the coking process much smoke and gas is given off, which, uniting with the air through the tubes J, is usually consumed as it passes through the fire-box below. Any of the smoke or gases that have escaped combustion, when they reach the vicinity of the tubes $e$, may here receive additional air through the perforations in the plate D, so that the combustion may be carried on into one or more of the hot-air chambers above. The water-tubes $b'$ surround the fire, forming a wall to keep the coals in place, but separated far enough to admit of the hot air and gases passing between them. A large amount of heat is absorbed by these tubes, and as the water in them is heated and rises, and its place is supplied by water from the space between the heads C and C', a current of water is formed down the water-legs, and, in fact, a free circulation generally through the boiler is had. The three hot-air chambers, each immersed in water, furnish ample surface for the absorption of all the heat that it is possible to utilize in boilers of this class. By opening the dampers $e^2$ a strong draft is caused, when necessary, in kindling a fire. When these dampers are closed, it will be seen that the hot air enters each of the chambers F and G at points the farthest possible from the respective points of discharge.

When used to heat water, of course the boiler may be entirely filled with water.

What I claim is—

1. In an upright steam-boiler or water-heater, the combination of two vertical fuel-magazines, each in the shape of a truncated cone, and each provided with horizontal cold-air tubes, substantially as shown and described.

2. In an upright steam-boiler or water-heater, the combination, with one or more truncated-cone-shaped fuel-magazines, each provided with horizontal cold-air tubes, of the vertical tubes $b'$, substantially as set forth.

3. In an upright steam-boiler or water-heater, the combination, with the plate $b^3$, having the sheet C secured thereto, of the plate D, having a perforated sloping top extending to and against the plate $b^3$, and forming an air-chamber, and the tubes $d$, adapted to supply the said chamber with air, substantially as shown and described.

4. In an upright steam-boiler or water-heater, the combination, with the horizontal crown-sheet, having the sloping part $b^2$, of the plate $b^3$, the latter forming a support for the former, substantially as shown and described.

5. One or more funnel-shaped disks, $c$, adapted to connect the plates C and C', and adapted to support the grates, substantially as described, and for the purpose specified.

6. In an upright boiler or water-heater, the combination, with the chambers E and F, of the tubes $e'$ and dampers adapted to close said tubes, substantially as set forth.

7. In an upright steam-boiler or water-heater, the combination of the hot-air chambers E, F, and G, connected with the outer air by the tubes $h$, and with each other by the tubes $f$ and $e'$, the latter being provided with dampers $e^2$, substantially as shown and described.

8. The hot-air chamber F, provided with the dampers $e^2$, substantially as described, and for the purpose specified.

In testimony whereof I sign this specification, in the presence of two witnesses, this 10th day of May, 1883.

JAMES W. UPSON.

Witnesses:
 CHAS. H. DORER,
 ALBERT E. LYNCH.